United States Patent [19]

Adlerborn et al.

[11] Patent Number: 4,505,871
[45] Date of Patent: Mar. 19, 1985

[54] METHOD FOR MANUFACTURING AN OBJECT OF SILICON NITRIDE

[75] Inventors: Jan Adlerborn; Hans Larker; Jan Nilsson, all of Robertsfors, Sweden

[73] Assignee: ASEA Aktiebolag, Västerås, Sweden

[21] Appl. No.: 525,263

[22] Filed: Aug. 22, 1983

Related U.S. Application Data

[63] Continuation of Ser. No. 259,155, Apr. 30, 1981, abandoned, which is a continuation of Ser. No. 034,509, Apr. 30, 1979, abandoned.

[30] Foreign Application Priority Data

May 2, 1978 [SE] Sweden ................................ 7804990

[51] Int. Cl.³ ............................................... B22F 3/14
[52] U.S. Cl. ....................................... 264/325; 264/332
[58] Field of Search ................................ 264/332, 325

[56] References Cited

U.S. PATENT DOCUMENTS 4,112,143  9/1978  Adlerborn ........................... 264/332
4,381,931  5/1983  Hunold ................................. 264/65

FOREIGN PATENT DOCUMENTS 1374033  11/1974  United Kingdom .

Primary Examiner—John A. Parrish
Attorney, Agent, or Firm—Lalos, Leeds, Keegan, Lett, Marsh, Bentzen & Kaye

[57] ABSTRACT

Disclosed is a method for manufacturing an object of silicon nitride. In the method, a body preformed from silicon nitride is surrounded with a casing which is permeable to gas. Upon heating, the casing is transformed into a layer which is impermeable to a pressure medium which is used during isostatic pressing of the preformed body while a pressure outside the casing is maintained which is at least as high as the pressure of the gas which is present in the pores of the preformed product. After the casing has been made impermeable to the pressure medium and the preformed body has been enclosed therein, the isostatic pressing is carried out while the body is simultaneously sintered.

10 Claims, 6 Drawing Figures

METHOD FOR MANUFACTURING AN OBJECT OF SILICON NITRIDE

This is a continuation of co-pending application Ser. No. 259,155, filed Apr. 30, 1981, which in turn was a continuation of application Ser. No. 034,509, filed Apr. 30, 1979.

BACKGROUND OF THE INVENTION

In the manufacture of objects of silicon nitride by sintering powder of the material while using isostatic pressing, the powder is suitably preformed into a manageable powder body. Such preforming can be accomplished by subjecting the powder to an isostatic compaction, for example, the powder being in a sealed capsule of yielding material such as a plastic capsule. The compaction can advantageously be carried out without the use of a binder at a pressure of at least 100 MPa and at room temperature or any other temperature which is considerably below the temperature during the compression used in connection with sintering. The preformed product can thereafter be given its desired shape by machining. In preforming a body, it is also possible to use, among other things, conventional techniques for the manufacture of ceramic goods. In such techniques, the silicon nitride powder is usually mixed before preforming with a temporary binder, for example methyl cellulose, cellulose nitrate, an acrylate binder, a wax or a mixture of waxes and after preforming, the binder is driven off by heating so that the preformed powder body becomes essentially free from binder.

When the preformed powder body is subjected to the isostatic pressure at the sintering temperature, in order to give the desired dense sintered product, the body must be enclosed in a casing which, during the pressing, is able to prevent the pressure medium used, normally a gas, from penetrating into the powder body. The casing, which like its contents is liberated from undesirable gases during a processing stage prior to sealing, must of course also have sufficiently high strength or viscosity during the isostatic pressing so as not to itself penetrate into the pores of the preformed powder body. When a preformed capsule of glass is chosen as the casing, the glass must be of a high-melting type in order not to run off or penetrate into the powder body at the sintering temperature. However, such a glass cannot be prevented, when softening, from accumulating in pockets and other cavities of the preformed powder body. Such accumulations of glass often lead to fractures at protruding portions of the sintered object when the object cools down due to differences in the coefficients of thermal expansion between the silicon nitride and the glass. The above method is therefore only suitable for the manufacture of objects having a very simple shape.

If it is desired to manufacture objects having a very complicated shape, the casing can be formed by dipping the preformed powder body into a suspension of particles of high-melting glass or otherwise surround the body with a layer of particles of such glass and then heating the powder body under vacuum at a temperature such that the particles form a tight casing around the body. The latter method allows the application of a thin casing which closely follows the shape of the powder body so that accumulations of glass on the sintered object can be avoided and thus also the disadvantages connected therewith. A tight casing is only achieved at high temperatures since the glass of course has to be of high-melting type in order not to run off or penetrate into the powder body during the sintering of the silicon nitride.

To avoid dissociation of the silicon nitride due to the departure of nitrogen at these temperatures, proposals have been made to use a porous layer of glass of a low-melting type over a porous layer of glass of a high-melting type. In this known procedure, when the powder body in being degassed, the outer porous layer is transformed into a layer impermeable to the pressure medium. When a dense layer has been formed, pressure is applied on the enclosed powder body with argon or helium to counteract dissociation of the silicon nitride during the continued temperature increase. During this temperature increase, the glass in the outer layer reacts with the material in the inner porous layer while forming an increasingly high-melting glass and while still maintaining a layer impermeable to or impenetratable by the pressure medium. Finally a glass layer which is impermeable to the pressure medium is formed of the innermost part of the inner porous layer before the glass in the outer layer is able to run off. This last formed glass layer forms a tight casing around the powder body when the isotatic pressing of the preformed product is carried out at the sintering temperature.

SUMMARY OF THE INVENTION

According to the method of the present invention, it is possible to manufacture high density objects of silicon nitride by isostatic pressing with greater reproducibility than with previously known methods.

The present invention relates to a method for manufacturing an object of silicon nitride by isostatically pressing a body preformed from silicon nitride powder with a gas-permeable casing which is transformed into a casing which is impermeable to the pressure medium and encloses the preformed body, the isostatic pressing thereafter being carried out while sintering the preformed body. The gas-permeable casing is transformed into the casing which is impermeable to the pressure medium while the gas-permeable casing is in contact with a pressure gas and while a pressure in the pressure gas is maintained which is at least as great as the pressure simultaneously prevailing in the gas which is present in the pores of the preformed product. The preformed body is degassed, but preferably not until the gas-permeable casing has been applied thereon.

A probable explanation of the favorable result obtained with the method according to the present invention is that the method ensures the formation of a tight casing around the preformed body more efficiently than in previously known methods. In the previously known methods where the tight casing is formed on the body, the formation of the casing takes place while the body is being degassed. The continuous departure of gases which are present in the powder body or which are formed in the powder body by contaminants or in the powder material itself, can then cause the formation of bubbles and later of cracks in the casing which was intended to enclose the powder body tightly. Consequently, a tight containment is not always achieved. In contrast, according to the present invention, the departure of gases from the powder body under the formation of the casing for containing the powder body is prevented by maintaining a pressure in the pressure gas which is at least as high as the pressure of the gas which is present or formed in the pores of the powder body.

Consequently, a casing is formed having no defects or the like.

While the method of the present invention is primarily discussed herein with reference to the manufacture of objects from silicon nitride, it should be realized that the method is also applicable to the manufacture of objects from other powdered materials such as other ceramic materials or metallic materials and particularly to materials having a sintering temperature in excess of 1000° C. such as iron-based alloys including 3% Cr—Mo steel and 12% Cr—Mo—V—Nb steel, nickel based alloys, and metal oxides including $Al_2O_3$.

Further objects, advantages and features of the present invention will become more fully apparent from a detailed consideration of the remainder of the specification including the examples and the appended claims in conjunction with the accompanying drawings.

DETAILED DESCRIPTION OF THE PREFERRED EMBODIMENTS

Figure 1:
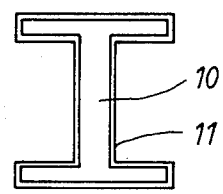
FIG. 1 shows a preformed body of silicon nitride, the casing of which before heat-treatment consists of a porous layer of a high-melting glass.

As was set forth previously, the present invention relates to a method for manufacturing an object of silicon nitride by isostatically pressing a body preformed from silicon nitride powder with a gaseous pressure medium, the preformed body being surrounded with a gas-permeable casing which is transformed into a casing which is impermeable to the pressure medium and encloses the preformed body, the isostatic pressing thereafter being carried out while sintering the preformed body. The gas-permeable casing is transformed into the casing which is impermeable to the pressure medium while the gas-permeable casing is in contact with a pressure gas and while a pressure in the pressure gas is maintained which is at least as great as the pressure simultaneously prevailing in the gas which is present in the pores of the preformed product. The preformed body is degassed, but preferably not until the gas-permeable casing has been applied thereon.

As the pressure medium, inert gases such as argon and helium as well as nitrogen gas are preferred. As a pressure gas for transforming the gas-permeable casing into the casing impermeable to the pressure medium, nitrogen gas is preferred. It is also possible, however, to use other gases which do not damage the powder body by forming undesirable reaction products or producing unacceptable porosities in the powder body for the pressure gas.

According to a suitable embodiment of the present invention, the gas-permeable casing consists of a porous layer which at least substantially completely surrounds the preformed body and which is transformed into a gas-tight layer around the preformed body. The porous layer, which suitably has a thickness within the range of about 0.05 to 1 mm, may be applied by, among others, dipping the preformed body into a suspension of a particulate material which is to form the casing, or by flame spraying or another thermal spraying process. The particulate material may suitably have a size within the range of 0.1 to 100 microns.

According to another suitable embodiment of the invention, the gas-permeable casing consists of one or more elements in the form of plates or the like arranged on the preformed body. These plates soften and change their shape when heated and are thereby transformed into a casing impermeable to the pressure medium by the fact that element parts, which when brought into contact with each other when changing their shape, sinter together.

The material of the casing, i.e., the material of the particles and the elements respectively in the above-mentioned embodiments, may advantageously consist of a high-melting glass such as Vycor glass containing 96.7 percent by weight $SiO_2$, 2.9 percent by weight $B_2O_3$ and 0.4 percent by weight $Al_2O_3$, or of quartz glass and mixtures of particles (the first-mentioned embodiment), for example $SiO_2$ and $B_2O_3$ which when heated form a gas-tight glass layer. It is also possible to use a high-melting metallic material having the ability to form a layer impermeable to the pressure medium, for example, molybdenum, tungsten and other refractory metals. When using a high-melting glass in the casing, a temperature of about 1200° to 1650° C. is suitably used when the casing is made impermeable to the pressure medium.

The material in the casing, i.e. the material in the particles and the elements respectively in the above-mentioned embodiments, may, under certain circumstances, also consist of a low-melting glass if a porous layer of a high-melting material such as a high-melting glass or high-melting metallic material is arranged inside the casing and transformed into a layer impermeable to the pressure medium after the casing has been made impermeable to the pressure medium. In addition, when using more than one porous layer, each porous layer may be applied in in the manner previously described by dipping the body into a suspension of the particulate material, by flame spraying or other thermal spraying processes. Each porous layer may suitably have a thickness within the range of about 0.05 to 1 mm and the particles may have a grain size within the range of about 0.1 to 100 microns. As examples of materials that can be used in casings of a low-melting glass, there may be mentioned Pyrex glass containing 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$ and 0.3 percent by weight CaO, and further an aluminum silicate containing 58 percent by weight $SiO_2$, 9 percent by weight $B_2O_3$, 20 percent by weight $Al_2O_3$, 5 percent by weight CaO and 8 percent by weight MgO, as well as mixtures of particles of substances, for example $SiO_2$, $B_2O_3$, $Al_2O_3$, and alkaline metal oxides and alkaline earth metal oxides, which when heated form a gas-impermeable glass layer.

When using a low-melting glass in the casing and a porous layer positioned thereinside, a temperature of about 600° to 1000° C. is suitably used to make the casing impermeable to the pressure medium and a temperature of about 1200°–1600° C. is used to make the porous layer inside the casing impermeable to the pressure medium. If the inner layer is densified under isostatic pressure, which may be achieved after the outer layer has become gas-tight, temperatures of about 1000° to 1200° C. may be used. For such a densification, a pressure of the order of magnitude of 20–300 MPa is required The pressure used when sintering the preformed silicon nitride is dependent upon whether a sintering-promoting additive such as magnesium oxide has been added to the silicon nitride. If no additive is used, the pressure should be at least about 100 MPa, preferably about 200–300 MPa. If an additive is used, a lower pressure is sufficient but the pressure should be at least 20 MPa. The sintering of the preformed body should be carried out at a temperature of at least about 1600° C., preferably in the range of about 1600°–1900° C.

The invention will be explained in more detail by describing several examples with reference to the accompanying schematic drawing. In the examples, the silicon nitride powder used has a powder grain size of less than 7 microns and contains about 0.5 percent by weight free silicon and about 0.1 percent by weight magnesium oxide as a sintering promoting additive. The powder is placed within a capsule of plastic such as softened polyvinyl chloride or rubber which has approximately the same shape as the preformed powder body to be manufactured. Thereafter, the capsule is sealed and placed in a pressure device, for example, the device shown in FIGS. 1 and 2 in British Pat. No. 1,522,705. The powder is compacted at about 600 MPa for a period of about 5 minutes. After compaction is finished, the capsule is removed and the preformed powder body thus manufactured is machined into the desired shape.

EXAMPLE 1

Preformed body 10, which is shown schematically in FIG. 1 and is cylindrical and has disc-shaped flanges, is either made from powder degassed in a vacuum at about 1000° C. or the preformed body itself is degassed in a vacuum at about 1000° C. for about four hours. The degassed preformed body is provided with a gas-permeable casing in the form of porous layer 11 by being dipped into a water suspension of a glass powder consisting of 96.7 percent by weight $SiO_2$, 2.9 percent $B_2O_3$ and 0.4 percent by weight $Al_2O_3$, and then drying.

Figure 4:
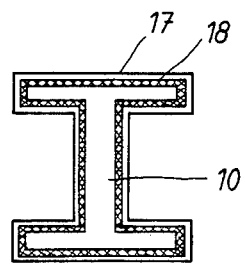
FIG. 4 illustrates a preformed body of silicon nitride, the casing of which before heat-treatment consists of a porous layer of a low-melting glass.

The preformed body thus treated is thereafter placed in a high-pressure furnace which has a conduit for discharging gas for degassing of the powder body and for supplying gas to generate the pressure necessary for the isostatic pressing. The furnace is also provided with heating devices. Such a high pressure furnace is disclosed for example in the previously mentioned British Pat. No. 1,522,705 and is shown in FIG. 4 thereof.

The preformed powder body with the applied casing is first degassed in the high-pressure furnace for approximately two hours at room temperature. Thereafter, the furnace is filled with nitrogen gas of atmospheric pressure and the temperature of the furnace is raised to about 1200° C. over a period of approximately two hours while the pressure is maintained. The temperature is then increased successively during the course of about three hours from about 1200° C. to about 1650° C. while simultaneously successively introducing nitrogen gas to a pressure of about 0.7 MPa, the pressure outside the casing of the preformed body being at all times maintained at at least the pressure which prevails in the remaining gas in the pores of the preformed body. When the temperature has reached about 1650° C., a casing impermeable to the nitrogen gas has been formed from layer 11. Thereafter, additional nitrogen, argon or helium gas is added to the pressure level to yield a pressure of about 200–300 MPa in the pressure medium at the final sintering temperature. The temperature is then raised to about 1700–1800° C., i.e., to a suitable sintering temperature or the silicon nitride. A suitable time for the sintering under the conditions mentioned is at least two hours. After the sintering is completed, the furnace is allowed to cool to a suitable discharge temperature and the sintered object is then cleaned of glass by blasting.

EXAMPLE 2

Figure 2:
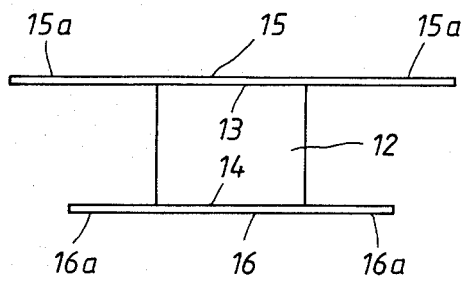
FIG. 2 shows a preformed body of silicon nitride, the casing of which before heat-treatment consists of elements in the form of plates of a high-melting glass.
Figure 3:
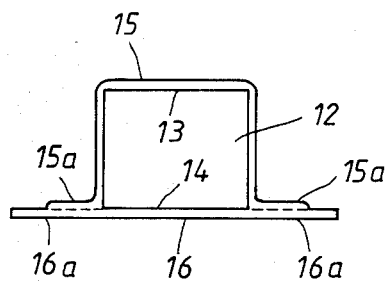
FIG. 3 shows the body of FIG. 2 after heat-treatment.

The preformed body 12 as shown in FIG. 2 is surrounded with a gas-permeable casing consisting of two elements in the form of plates 15 and 16 of the same glass as that which is used for the powder in Example 1. Once body 12 with the casing has been placed in a high-pressure furnace, the body is subjected to the same treatment as the body of Example 1, i.e., it is degassed, heat-treated and isostatically pressed under the same conditions. During the temperature increase and the simultaneous pressure increase, the plate 15 softens and changes its shape as is shown in FIG. 3 and the end portions 15a and 16a sinter together so that the casing becomes tight about the body.

EXAMPLE 3

The preformed body 10 shown in FIG. 4, which is of the same type as the body of FIG. 1, is surrounded with a gas-permeable casing comprising a porous layer 17 of a low-melting glass and a porous layer 18 of a high-melting glass located inside the first porous layer. The casing is applied by first dipping the preformed body into a water suspension of a power of a high-melting glass consisting of 96.7 percent by weight $SiO_2$, 2.9 percent by weight $B_2O_3$ and 0.4 percent by weight $Al_2O_3$, and then after drying this layer, dipping into a water suspension of a powder of a low-melting glass consisting of 80.3 percent by weight $SiO_2$, 12.2 percent by weight $B_2O_3$, 2.8 percent by weight $Al_2O_3$, 4.0 percent by weight $Na_2O_3$, 0.4 percent by weight $Na_2O_3$, 0.4 percent by weight $K_2O$ and 0.3 percent by weight $CaO$, followed by additional drying.

The preformed body with the applied porous layers is placed in the high-pressure furnace and is degassed at room temperature as in Example 1. After filling the furnace with nitrogen gas of atmospheric pressure, the temperature of the furnace is raised to about 600° C. over a period of about two hours while maintaining the pressure. Thereafter the temperature is raised successively during the course of about three hours from about 600° C. to about 1000° C. while simultaneously providing additional nitrogen gas up to a pressure of 0.7 MPa, the pressure outside the casing of the preformed body being at all times maintained at at least the same pressure as that which prevails in the remaining gas in the pores of the preformed body. When the temperature has reached about 1000° C., a casing which is impermeable to the nitrogen gas has been formed from the layer 17.

Thereafter, additional nitrogen, argon or helium gas, is added to yield a pressure of about 100 MPa at about 1200° C. The temperature is then slowly raised to about 1200° C. and the pressure rises simultaneously. This temperature increase is achieved sufficiently slowly for the glass in the inner layer 18 to form a gas-impermeable layer before the glass in the casing 17 is able to run off. The pressure and the temperature are then raised to the values stated in Example 1 so as to sinter the preformed body.

EXAMPLE 4

Figure 5:
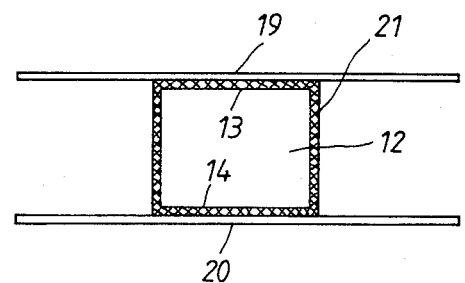
FIG. 5 shows a preformed body of silicon nitride, the casing of which consists of elements in the form of plates of a low-melting glass.
Figure 6:
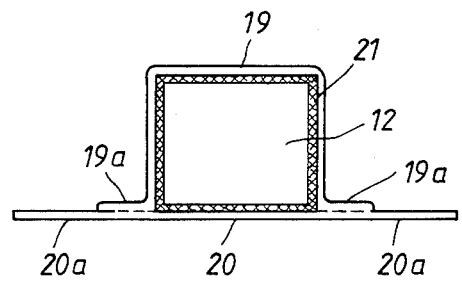
FIG. 6 shows the body of FIG. 5 after heat-treatment.

The cylindrical preformed body 12 shown in FIG. 5 is surrounded with a gas-permeable casing consisting of two elements located along end surfaces 13 and 14 and in the form of plates 19 and 20 of the same glass as that used in the layer 17 in Example 3 and a porous layer 21 located inside the elements of the same type as layer 18 in Example 3. When the body with casing has been placed within a high-pressure furnace, the body is subjected to the same treatment as the body in Example 3, i.e., it is degassed, heat-treated and isostatically pressed under the conditions mentioned therein. During the temperature increase, plate 19 softens and changes its shape as is shown in FIG. 6 and the end portions 19a and 20a then sinter together so that the casing becomes tight.

Elements 15, 16, 19 and 20 in FIGS. 2 and 5 may, of course, have a shape other than a plate-shape and may, for example, consist of more or less than bent elements or of a container or bottle provided with an opening. Of course, the elements should suitably be formed with regard to the shape of the preformed body.

If a binder such as the previously mentioned methyl cellulose, cellulose nitrate, an acrylate binder, a wax or a mixture of waxes having different melting points is used when manufacturing the preformed powder body, the binder is removed prior to or after the application of the porous layers, preferably by heating the powder body to about 400° to 700° C. in a vacuum. Thereafter, degassing and further treatment as described for a preformed powder body with no binder can be performed.

While the present invention has been described with reference to particular embodiments thereof, it will be understood that numerous modifications may be made by those skilled in the art without actually departing from the spirit and scope of the invention as defined by the appended claims.

We claim:

1. A method for manufacturing an object of silicon nitride utilizing isostatic pressing with a gaseous pressure medium, said method comprising:
   providing a body preformed from silicon nitride powder and having pores containing a gas;
   forming a casing on said body, said casing initially being gas-permeable to permit flow of gas therethrough and being capable of being transformed into a gas-impermeable condition upon heating to a transformation temperature level;
   surrounding the encased body with a gaseous environment;
   transforming the initially gas-permeable casing into a gas-impermeable condition by heating the same in said environment to a transformation temperature level;
   preventing the departure of gas from the pores of said body and through the casing during said transformation by maintaining the pressure of said surrounding environment during said transformation at a level which is at least as great as the simultaneously prevailing pressure of the gas in the pores of the body; and
   isostatically pressing and sintering the preformed body in said gas-impermeable casing at another pressure level that is substantially greater than said first mentioned pressure level.

2. The method as set forth in claim 1 wherein the gaseous environment comprises nitrogn.

3. The method as set forth in claim 1 wherein said casing initially comprises a gas-permeable, porous layer disposed on said preformed body in substantial surrounding relationship thereto.

4. A method as set forth in claim 1 wherein the casing initially comprises one or more elements arranged about the preformed body in a gas-permeable relationship, said elements softening and deforming and changing their shape when heated so as to conform to the shape of the preformed body and thereafter being transformed into said gas-impermeable casing by the fact that the elements, which are brought into contact with each other during the deformation, sinter together at said transformation temperature level.

5. A method as set forth in claim 4 wherein said elements are plates.

6. A method as set forth in claim 1 wherein the sintering temperature of the powder exceeds 1000° C., and the casing consists essentially of a high-melting glass.

7. The method as set forth in claim 6 wherein said transformation temperature level is about 1200° C. to 1650° C.

8. A method as set forth in claim 3 wherein said casing initially comprises inner and outer gas-permeable, porous layers, the inner layer being of a higher-melting glass than the outer layer, said outer layer thereby becoming gas-impermeable before the inner layer becomes gas-impermeable during said transforming step.

9. A method as set forth in claim 8 wherein the temperature is slowly increased during said transforming step after the outer layer has become impermeable and said method includes the step of permitting said outer layer to melt and run off only after the inner layer has become gas-impermeable.

10. A method for manufacturing an object from a powdered material utilizing isostatic pressing with a gaseous pressure medium, said method comprising:
   providing a body preformed from the powdered material and having pores containing a gas;
   forming a casing on said body, said casing initially being gas-permeable to permit flow of gas therethrough and being capable of being transformed into a gas-impermeable condition upon heating to a transformation temperature level;
   surrounding the encased body with a gaseous environment;
   transforming the initially gas-permeable casing into a gas-impermeable condition by heating the same in said environment to a transformation temperature level
   preventing the departure of gas from the pores of said body and through the casing during said transformation by maintaining the pressure of said surrounding environment during said transformation at a level which is at least as great as the simultaneously prevailing pressure of the gas in the pores of the body; and
   isostatically pressing and sintering the preformed body in said gas-impermeable casing at another pressure level that is substantially greater than said first mentioned pressure level.

* * * * *